No. 898,278. PATENTED SEPT. 8, 1908.
D. W. SMITH.
STEERING GEAR.
APPLICATION FILED JAN. 8, 1908.
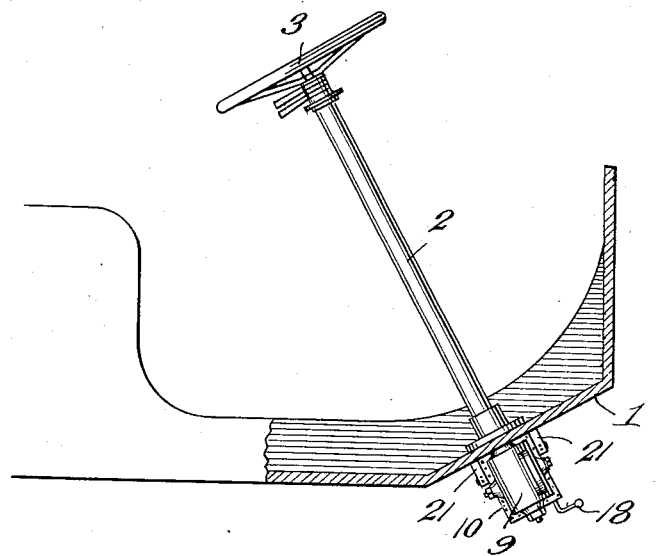
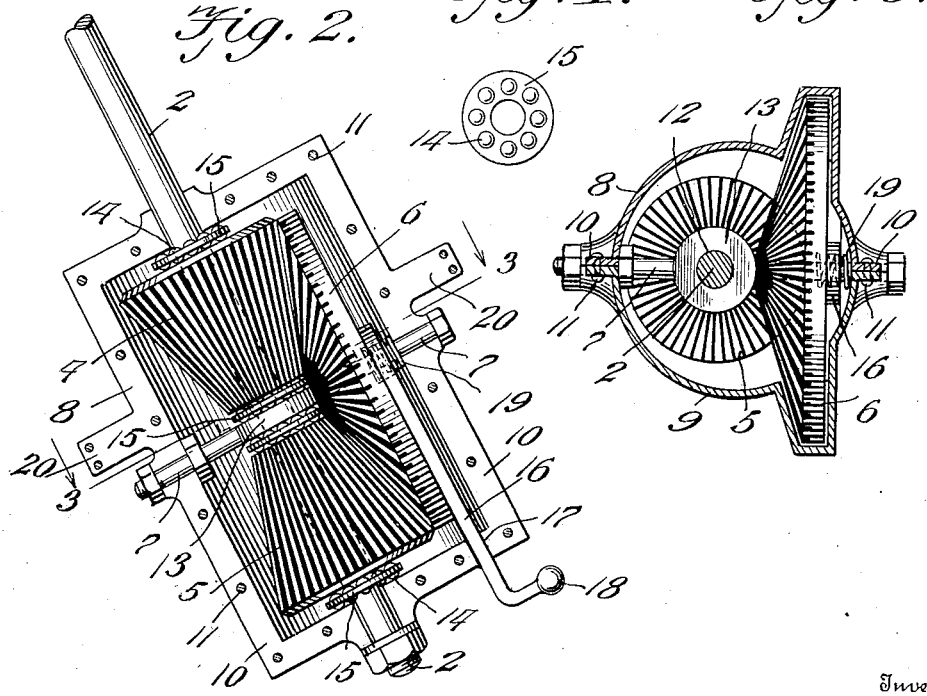
Witnesses
Frank B. Hoffman
R. M. Smith
Inventor
Daniel W. Smith
By Victor J. Evans
Attorney

UNITED STATES PATENT OFFICE.

DANIEL WHITE SMITH, OF OYSTER BAY, NEW YORK.

STEERING-GEAR.

No. 898,278.  Specification of Letters Patent.  Patented Sept. 8, 1908.

Application filed January 8, 1908. Serial No. 409,826.

*To all whom it may concern:*

Be it known that I, DANIEL WHITE SMITH, a citizen of the United States, residing at Oyster Bay, in the county of Nassau and State of New York, have invented new and useful Improvements in Steering-Gear, of which the following is a specification.

This invention relates to steering gear being especially designed for use in connection with automobiles, the object of the invention being to provide a simple, reliable and effective device for transmitting the motion of the steering shaft or rod to the connection which controls the steering wheels.

With the above and other objects in view, the invention consists in the novel, construction, combination and arrangement herein fully described, illustrated and claimed.

In the accompanying drawings:—Figure 1 is a sectional elevation of the front portion of an automobile body, showing the improved steering gear applied thereto. Fig. 2 is an enlarged vertical sectional view of the steering gear. Fig. 3 is a cross section through the same taken on the line 3—3 of Fig. 2, looking in the direction indicated by the arrows. Fig. 4 is a detail view of one of the ball bearings.

In the drawings, 1 designates an automobile body, 2 the usual steering rod or shaft and 3 the steering wheel. In carrying out the present invention, the shaft 2 is extended through the bottom of the vehicle body and has mounted fast thereon a drive gear or pinion 4. The shaft extends below the pinion 4 and has loosely mounted on such projecting end an idle or equalizing gear or pinion 5 which is the exact counter-part of the gear 4 and set in reverse relation to the shaft as clearly shown in Fig. 2.

6 designates the driven gear which revolves on an axis at right angles to the shaft 2 and meshes directly with both of the gears 4 and 5. The gear 6 is mounted to turn on a bearing post 7 which is held in suitable recesses in the gear case which is composed of oppositely arranged separable sections 8 and 9 flanged as shown at 10 and secured together by rivets, bolts or other fasteners as shown at 11. The meeting faces of the sections of the gear case are provided with recesses and bearings for the shafts 2 and 7 as clearly shown in Fig. 2.

The bearing post 7 is secured rigidly at its opposite ends in opposite sides of the gear case and is provided with a central opening 12 through which the shaft 2 passes. Adjacent to the opening 12, the bearing post 7 is enlarged to form a bearing disk 13 and between said bearing disk and the inner ends of the gears 4 and 5, there are placed circular series of anti-friction balls 14 each series being controlled as to their relative positions by a ball spacing ring 15 which ring is provided with a circular series of openings corresponding to the number of balls 14 which work loosely in said openings while the ball spacing ring itself is held between the adjacent spaces of the gears 4 and 5 and the bearing ring or disk 13. Other ball bearings of similar construction are preferably mounted between the opposite ends of the gears 4 and 5 and the adjacent inner end walls of the gear case, as shown in Fig. 2. An easy and smooth working construction is thus obtained. The shaft 2 extends through both ends of the gear case as shown in Fig. 2 and is held at its lower end by a nut and washer as indicated at 15.

Secured to the outer face of the gear wheel 6 is an arm 16 which is carried rigidly by said gear wheel and which extends outward through a slot 17 in the gear case which slot is long enough to admit of the necessary amount of swing for the arm 16, said arm being provided with a terminal ball 18 adapted to fit in the socket of the usual connecting or steering rod which extends to the steering heads of the steering wheels, the last named parts not being shown.

19 designates a spring which backs up the driving gear 6 and holds the same in mesh with the gears 4 and 5, said spring being interposed between the back of the gear wheel 6 and the adjacent inner wall of the gear case.

20 designates oppositely projecting arms or extensions of the gear case by means of which the same is firmly secured to the under side of the body of the vehicle as shown in Fig. 1, the body being provided with downwardly projecting brackets or lugs 21 to which the arms or extensions 20 are bolted or otherwise rigidly secured.

The equalizing or idle gear 5 serves as a movable bearing for the gear wheel 6 and maintains the proper alinement and mesh between the gears 4 and 6 and obviates any twisting or clamping strain on the shaft 2 and the post 7. Said equalizing gear also adds to the smoothness of operation of the device as a whole by forming a bearing between the post 7 and the lower end of the gear case, thereby acting to support the bearing ring or disk 13 in proper relation to the ball bearing at the lower or small end of the gear 4.

Having thus described the invention, what is claimed as new, is:—

1. Steering gear of the class described comprising in combination with a steering rod shaft, a gear wheel mounted fast on the shaft, an equalizing gear mounted loosely on the same shaft, a driven gear mounted on an axis at right angles to said shaft, and meshing with the fast and loose gears on said shaft, and an oscillatory arm bearing a fixed relation to the driven gear and adapted to transmit motion to the steering connections of the steering wheels.

2. The combination with a steering shaft, of a drive gear fast on said shaft, an equalizing gear loose on said shaft, a driven gear turning on an axis at right angles to said shaft and meshing with said drive and equalizing gears, a steering wheel controlling arm carried by the driven gear, a gear case and a backing spring for the driven gear operating to hold the driven gear in mesh with the drive gear and equalizing gear.

3. Steering gear for automobiles and the like comprising in combination with the steering rod or shaft, a gear case, a drive gear fast on said shaft, an equalizing gear loose on said shaft a bearing post having an opening for said shaft, ball bearings interposed between said drive and equalizing gears and the bearing post, a driven gear meshing with the drive gear and equalizing gear and mounted on said bearing post, and a controlling arm for the steering wheels mounted fast on and carried by the driven gear, substantially as described.

In testimony whereof I affix my signature in presence of two witnesses.

DANIEL WHITE SMITH.

Witnesses:
W. F. BLAUVELT,
CHAS. W. ALLEN.